July 24, 1951  E. M. J. LEPICARD  2,561,580
DEVICE FOR CONTROLLING THE LEVEL OF LIQUIDS
Filed Aug. 6, 1947  2 Sheets-Sheet 1

Patented July 24, 1951

2,561,580

UNITED STATES PATENT OFFICE 2,561,580

DEVICE FOR CONTROLLING THE LEVEL OF LIQUIDS

Etienne Marie Jules Lepicard, Neuilly-sur-Seine, France

Application August 6, 1947, Serial No. 766,685
In France November 9, 1942

Section 1, Public Law 690, August 8, 1946
Patent expires November 9, 1962

7 Claims. (Cl. 137—104)

The invention relates to devices including a part, hereinafter called "control" part, intended to have its height varied in accordance with the variations of level of a liquid. Such a device may be for instance a regulator or indicator of the level of a liquid contained in a tank, boiler, etc., and more particularly a device for keeping a constant level in the feed tank of a carburetor.

The chief object of my invention is to make these devices such that they can advantageously replace the float apparatus generally used for this purpose, while eliminating a serious drawback inherent in this kind of apparatus.

Figure 1:
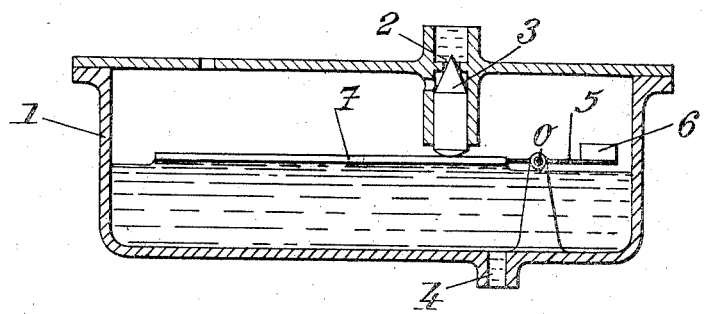

Preferred embodiments of my invention will be hereinafter described with reference to the accompanying drawings, given merely by way of example, and in which:

Fig. 1 shows in vertical section, a device made according to my invention for keeping the level of a liquid constant.

Figure 2:
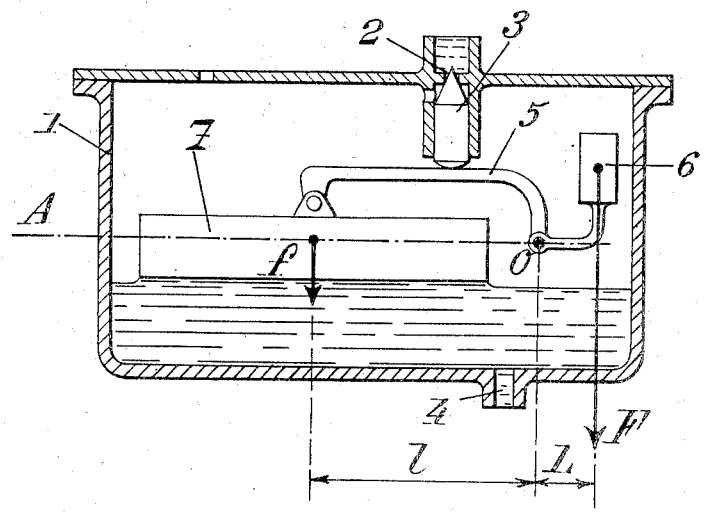
Figure 3:
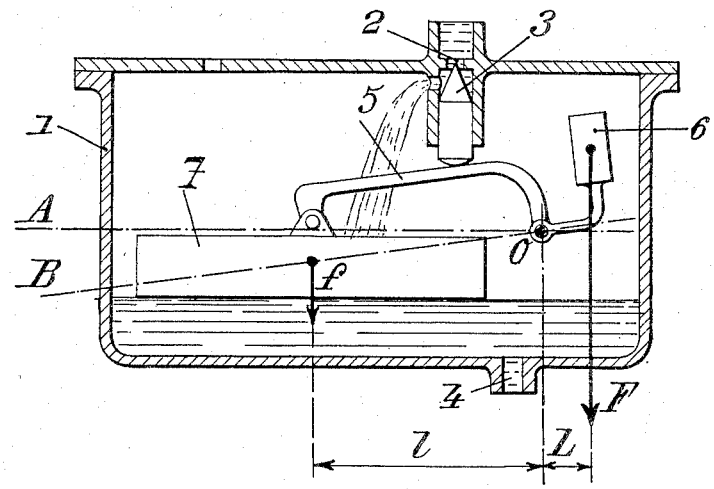
Figure 4:
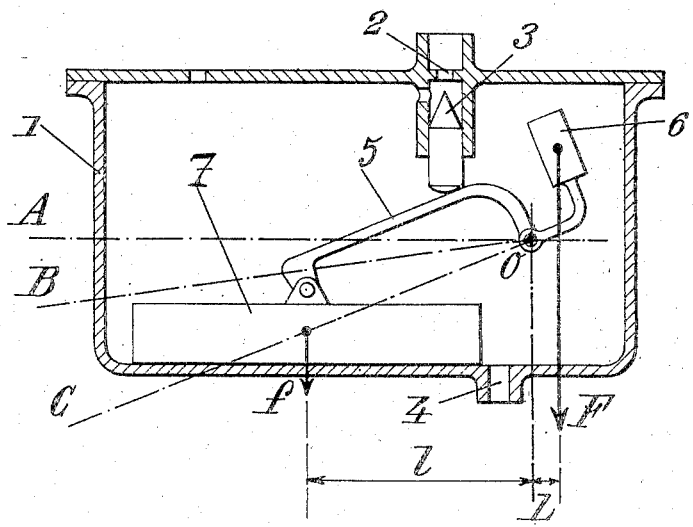

Figs. 2, 3 and 4 similarly show an analogous regulator but made according to a modification, various elements of this device occupying different characteristic positions on each figure.

The fundamental principle of the invention is to utilize, as control part to be influenced by the liquid level variations, not the customary float of conventional devices, but an element guided for upward and downward movement and such that, for at least a portion of said movement, downward displacement thereof is produced, when the level moves down, not by the decrease of an Archimedean thrust exerted thereon, but by the suction exerted by the liquid on its lower face, which is advantageously of plane shape.

The invention is based upon the fact that when a small plate is applied upon the surface of the liquid, it is necessary to exert an upwardly directed force which may be, according to the nature of the liquid and the matter that constitutes the plate, as high as 50 gr. of more per square decimeter for detaching said plate from said liquid surface.

In what follows I will describe by way of example the application of my invention to devices for keeping a constant level in a tank 1, these devices essentially including, like the usual float devices, an inlet orifice 2, controlled by a needle 3 or the like, an outlet orifice 4 and means for guiding the control part, these means consisting for instance, of an arm 5 pivoted at O and carrying at one of its ends the control part and, at the other end a counterweight 6. Of course the control part might as well be balanced by a spring.

According to a first embodiment (Fig. 1), the control part is balanced in such manner that, for at least a portion of its stroke it tends to move upwardly but remains stuck to the liquid contained in the tank.

The control part can then be a mere plate 7 of metal or any other body, or very small thickness (averaging a fraction of a milimeter) or, on the contrary thicker, and either solid or hollow, but preferably having a plane lower face.

It will be understood that if plate 7 is supposed to be in contact with the liquid, any drop of the liquid level will cause said plate to move down and therefore needle valve 3 to open, and that, on the contrary, when the level again moves up, the plate will also move upwardly under the preponderating effect of counterweight 6. The plate will thus instantaneously and faithfully follow the liquid level variations.

According to another embodiment, plate 7 is guided and balanced in such manner, that it is a little immersed in the liquid when it occupies the position for which needle valve 3 is closed. It is then given a volume such that it exerts thereon an Archimedean thrust capable of overcoming the resistance (for instance friction and reaction of the needle valve) that opposed its upward movement. But the whole is arranged in such manner that the absence of this Archimedean thrust is insufficient to produce downward movement of said plate. Anyway downward movement can only be produced by the effect of the adhesion of the plate to the liquid.

I may make use of exactly the same arrangement as in the case of Fig. 1, but in which the control part is so balanced as to move upwardly, under the effect of the forces, other than those due to the liquid, that act thereon, these forces comprising the friction forces and eventually those due to the needle valve thrust only up to a position for which needle valve 3 is not yet closed. If said part is given a sufficient volume, when the level rises above the height corresponding to said position, an Archimedean effect is produced which, added to the effect of said forces, will overcome the resistance that opposes further upward movement of said part and will cause the needle valve to close. The control part will then be slightly immersed in the liquid for the closed position of the needle valve. This arrangement permits automatic starting of the device when the tank is empty.

According to another embodiment (Figs. 2 to 4) plate 7 is balanced in the following manner:

In order to simplify explanations I will refer to a line of passing through O and fixed in position with respect to arm 5. When the plate is at the end of its upward stroke this line occupies position OA, Fig. 2.

The balancing is such that the plate tends to move upwardly under the effect of all the forces other than those due to the liquid that act thereon (these forces including the friction forces and the needle valve thrust) as long as said line OF is above a fixed direction OB, Fig. 3, itself located below the lowermost position assumed by this line under normal working conditions.

But, on the other hand, said balancing is such that said plate tends to move downwardly, under the effect of the same system of forces, once line OF has come below position OB, that is to say is between OB and OC (Fig. 4), this line OC corresponding to the lowermost possible position of the plate.

For this purpose, for instance, counterweight 6 is so arranged that, if F and f are the resultants of the forces acting upon arm 5 respectively on the side of the counterweight and on the side of the plate, then, For positions of line OF that are above OB: $fl$ is smaller than $Fl$
For the position corresponding to OB: $fl=Fl$ and
For the positions of line OF that are below OB: $fl$ is greater than $Fl$, $l$ and $L$ being respectively the lever arms of forces $f$ and $F$ with respect to axis O.

It then suffices to give plate 7 a volume such that, as long as line Of is below OB the liquid exerts on the plate an Archimedean thrust sufficient to lift said plate, and I obtain a self starting device which for the whole of the normal zone of operation (angle AOB), is identical to the device shown on Fig. 1.

My device for regulating or indicating the level of a liquid in a tank has over float devices, the following advantages, among others:

*a.* As body 7 rests upon the free surface of the liquid its position of equilibrium is constant whatever be the density of the liquid;

*b.* For the same reason and due to the high adhesion between body 7 and the free surface of the liquid, said body immediately follows the variations of the liquid level, which makes the device highly sensitive and eliminates delay in the opening or closing of the valve as occur in the case of a float control;

*c.* When the liquid is subjected to sudden movements, the great adhesion of the liquid to the under face of body 7 eliminates "vibrations" capable of producing level variations.

*d.* The balanced element can be made in a simple and cheap manner for instance in the form of a solid disc, whereas an ordinary float is costly, delicate to make and liable to be deteriorated.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the kind described which comprises, in combination, means forming a chamber adapted to contain a variable amount of liquid, a control part movable upwardly and downwardly in said chamber, and bias means for urging said part upwardly for at least a portion of its displacement in said chamber, the bias force exerted by said bias means on said part being greater than the weight of said part, the under surface of said control part, adapted to rest on said liquid, being of flat shape and of an area such that the adhesion between said liquid and said surface keeps them in contact against the action of the positive difference between said upward bias force and said weight.

2. A device according to claim 1 in which said control part is a thin plate of plane shape.

3. A device of the kind described which comprises in combination means forming a chamber adapted to contain a variable amount of liquid, a control part movable upwardly and downwardly in said chamber, bias means for urging said part upwardly for at least a portion of its displacement in said chamber, the bias force exerted by said bias means on said part being greater than the weight of said part, the under surface of said control part, adapted to rest on said liquid, being of flat shape and of an area such that the adhesion between said liquid and said surface keeps them in contact against the action of the positive difference between said upward bias force and said weight, and a valve operatively connected with said control part for controlling the inflow of liquid into said chamber, said upward bias means being so determined as to be insufficient by themselves to bring said valve into closed position, so that said control part is slightly immersed in said liquid when it occupies a position corresponding to the closing of said valve.

4. A constant level chamber device which comprises, in combination, means forming a chamber adapted to contain a variable amount of liquid, a lever pivoted to said means in said chamber, a control part carried by said lever, and counterweight means operatively connected with said lever to have a moment with respect to the lever pivot axis opposed to the moment of the control part weight with respect to the same axis and greater than it for at least a range of positions of said part in said chamber, the under surface of said control part, adapted to rest on said liquid, being of flat shape and of an area such that the adhesion between said liquid and said surface keeps them in contact with each other against the action of the maximum positive difference between said counterweight moment and said weight moment.

5. A constant level chamber device which comprises, in combination, means forming a chamber adapted to contain a variable amount of liquid, a lever pivoted to said means in said chamber, a control part rigidly carried by said lever, and counterweight means operatively connected with said lever to have a moment with respect to the lever pivot axis opposed to the moment of the control part weight with respect to the same axis and greater than it for at least a range of positions of said part in said chamber, the under surface of said control part, adapted to rest on said liquid, being of flat shape and of an area such that the adhesion between said liquid and said surface keeps them in contact with each other against the action of the maximum positive difference between said counterweight moment and said weight moment.

6. A constant level chamber device which comprises, in combination, means forming a chamber adapted to contain a variable amount of liquid, a lever pivoted to said means in said chamber, a control part pivoted to said lever about an axis parallel to the pivot axis of said lever, and counterweight means operatively connected with said lever to have a moment with respect to the lever pivot axis opposed to the moment of the control part weight with respect to the same axis and greater than it for at least a range of positions of said part in said chamber, the under surface of said control part, adapted to rest on said liquid, being of flat shape and of an area such that the adhesion between said liquid and said surface keeps them in contact with each other against the action of the maximum positive difference between said counterweight moment and said weight moment.

7. A constant level chamber device which comprises, in combination, means forming a chamber adapted to contain a variable amount of liquid, a lever pivoted to said means in said chamber, a control part carried by said lever and counterweight means operatively connected with said lever so that the difference between the moment of the force of said counterweight means with respect to the lever pivot axis and the moment of the weight of said control part with respect to the same axis is positive for positions of said part above a predetermined critical position thereof in said chamber and negative for positions of said part below said critical position, the under surface of said control part, adapted to rest on said liquid, being of flat shape and of an area such that the adhesion between said liquid and said surface keeps them in contact with each other against the action of the maximum positive difference between said counterweight moment and said weight moment.

ETIENNE MARIE JULES LEPICARD.

REFERENCES CITED

The following references are of record in the file of this patent:

UNITED STATES PATENTS

| Number | Name | Date |
| --- | --- | --- |
| 129,885 | Dustin | July 30, 1872 |
| 248,877 | Osborne | Nov. 1, 1881 |
| 1,616,078 | Dickerson | Feb. 1, 1927 |